United States Patent
Changlani et al.

(10) Patent No.: US 11,240,723 B2
(45) Date of Patent: Feb. 1, 2022

(54) DYNAMIC CLIENT SEGREGATION IN 802.11AX NETWORKS

(71) Applicant: Hewlett Packard Enterprise Development LP, Houston, TX (US)

(72) Inventors: Nitin Changlani, Milpitas, CA (US); Sachin Ganu, San Jose, CA (US); Eldad Perahia, Park City, UT (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 145 days.

(21) Appl. No.: 16/703,351

(22) Filed: Dec. 4, 2019

(65) Prior Publication Data
US 2021/0176685 A1  Jun. 10, 2021

(51) Int. Cl.
*H04W 36/16* (2009.01)
*H04W 24/02* (2009.01)
*H04W 36/38* (2009.01)
*H04W 84/12* (2009.01)

(52) U.S. Cl.
CPC .......... *H04W 36/16* (2013.01); *H04W 24/02* (2013.01); *H04W 36/38* (2013.01); *H04W 84/12* (2013.01)

(58) Field of Classification Search
CPC ..... H04W 36/16; H04W 36/38; H04W 84/12; H04W 88/06; H04W 48/20; H04W 48/16; H04W 24/02; H04W 48/18; H04W 88/10; H04W 8/18; H04W 28/08; H04W 40/248
See application file for complete search history.

(56) References Cited

U.S. PATENT DOCUMENTS

| | | | |
|---|---|---|---|
| 9,936,492 B2 | 4/2018 | Wentink et al. | |
| 10,091,813 B2 | 10/2018 | Wang et al. | |
| 10,116,360 B2 | 10/2018 | Seok | |
| 2017/0373808 A1 | 12/2017 | Park et al. | |
| 2020/0008237 A1* | 1/2020 | Lanante | H04W 52/243 |
| 2020/0037183 A1* | 1/2020 | Ganu | H04W 24/08 |
| 2020/0296739 A1* | 9/2020 | Monajemi | H04W 72/1247 |

OTHER PUBLICATIONS

Flores, A. et al., A Scalable Multi-User Uplink for Wi-Fi. (Research Paper). Feb. 16, 2016, 13 Pgs.

* cited by examiner

*Primary Examiner* — Magdi Elhag
(74) *Attorney, Agent, or Firm* — Hewlett Packard Enterprise Patent Department

(57) ABSTRACT

Systems and methods for dynamic client segregation in 802.11ax networks includes determining, for each access point of a plurality of access points in a network, a ratio comprising a number of fully uplink multi-user capable client devices to a total number of client devices connected to the access point; and steering, based on at least the ratio, client devices of the network to particular access points of the plurality of access points.

11 Claims, 6 Drawing Sheets

DYNAMIC CLIENT SEGREGATION IN 802.11AX NETWORKS

BACKGROUND

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The Institute of Electrical and Electronics Engineers (IEEE) publish many popular specifications for use in wireless under the 802.11 standard family 802.11 continues to evolve in an attempt to address all challenges presented with the proliferation of wireless devices.

In particular, the IEEE 802.11 ax project started in May 2014 with the formation of TGax as a successor to the successful IEEE 802.11ac standard. The main objectives of the TGax was to define a physical layer and a medium access control capable of supporting at least a four times improvement in average throughput per station in a dense deployment scenario when compared to IEEE 802.11 ac. However, the 802.11ax standard itself does not address all issues that need to be solved. Further improvements are needed to maximize the potential of 802.11ax.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
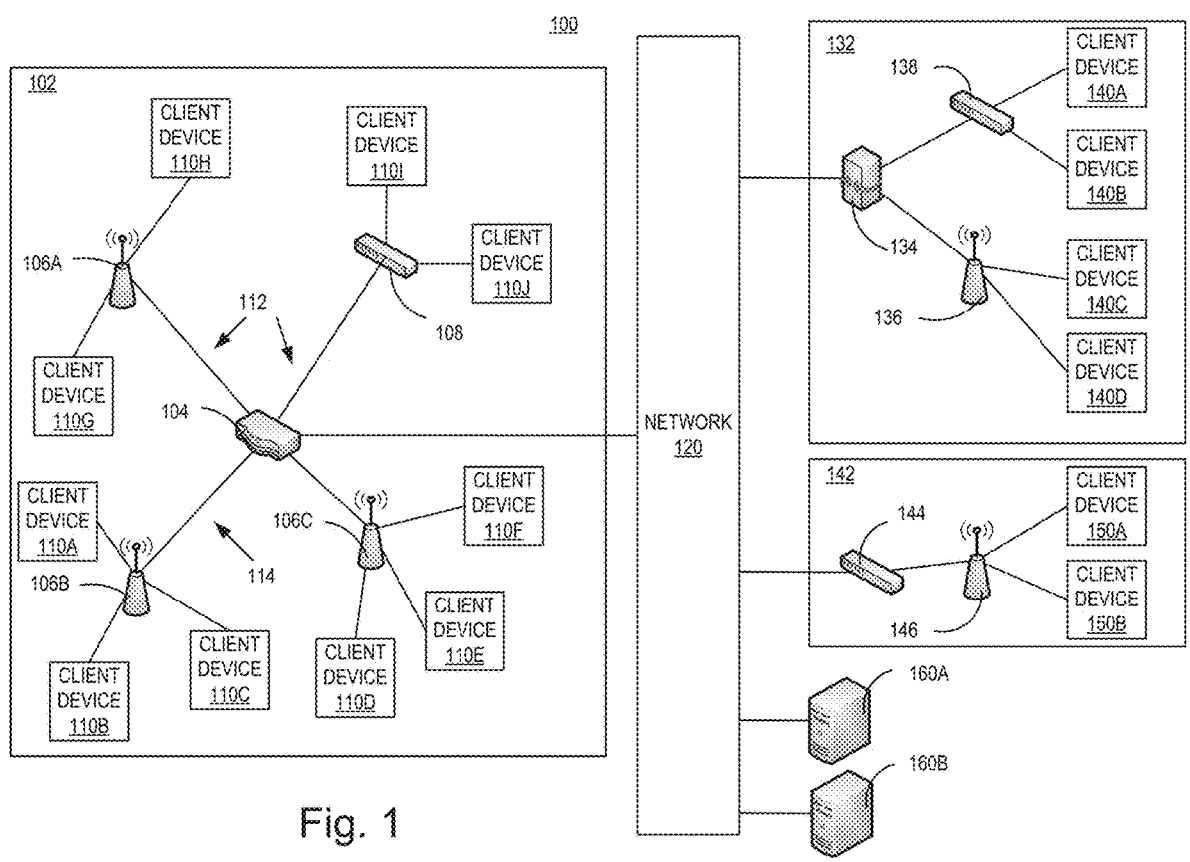
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Implementations of the disclosed technology may include systems, methods, and computer readable mediums for dynamic client segregation in 802.11ax networks in accordance with one embodiment.

To understand the present invention, a basic understanding of 802.11 and 802.11ax is needed. The minimum understanding necessary is described below, but further detail and guidance may be found in the 802.11ax standard, as well as other related 802.11 standards.

Multi-User Multiple Input Multiple Output (MU-MIMO) allows a wireless device, such as an access point, to communicate with multiple devices simultaneously. This decreases the time each device has to wait for a signal and can dramatically speed up a network. In short, MU-MIMO works by using multiple antennas to send data to multiple devices stations.

One of the main features added to the 802.11ax specification was Orthogonal Frequency-Division Multiple Access (OFDMA). At a physical layer level, it means multiple entities transmitting data at the same time over different frequency tones/subcarriers where the subcarriers are orthogonal to each other. A timeslot containing a certain group of tones is known as a RU.

IEEE 802.11ax defines downlink Multi-User Physical Layer Protocol Data Units (MU-PDU) in a MU-MIMO format, an OFDMA format, or a mixture of both. The standard also defines uplink MU-PPDU in a MU-MIMO and OFDMA format. For the uplink MU-PPDUs, the access point needs to schedule certain stations within a timeslot to send data on uplink using different RUs. The stations are notified of the transmit characteristics like (transmit power, modulation and coding, etc.) and the specific RU to be used for the uplink transmission.

The 802.11ax standard allows for uplink multi-user (UL MU) transmissions that are synchronized across the transmitting 802.11ax UL MU capable stations with a trigger frame (TF). These are called trigger-based UL MU transmissions. The trigger can either be a control frame by itself or the trigger response scheduling (TRS) control of the HT control field in the Media Access Control (MAC) header when the field is encoded as its HE variant.

Contrary to this, the Operation Mode (OM) Control variant of the HE-style HT control field allows 802.11ax UL MU capable stations to disable trigger-based UL MU traffic. This is done by setting the "UL MU Disable" subfield and with this, the station is not mandated to respond to the TF or TRS-laden frames. The standard also provides for an additional subfield in the OM Control subfield—the "UL MU Data. Disable" subfield—for stations that would prefer using UL MU for control frames but not data frames.

Until all client devices fully support UL MU capability, APs would need to serve clients with different UL MU behaviors. However, the efficiency of channel utilization for the APs will still remain diminished due to those clients that either support UL MU only for control frames or do not support it at all. All legacy clients—802.11ac and older—will be a part of the latter category as well and will be a constant offset for the inefficiency of channel utilization.

Given this insight and background, there are potential ways to optimize channel utilization of a Basic Service Set (BSS) by segregating the clients based on their capability to support UL MU transmissions. In one aspect, the invention involves pooling clients across BSSs in an extended network so that legacy and UL MU incapable clients do not degrade the performance of UL MU capable clients, while having optimal channel utilization for themselves. Additional details are discussed below.

For a BSS which has a wide variety of clients, the clients can be largely divided into three groups:

(1) Clients with full support for TB UL MU transmissions (fully-ul-mu-capable devices). These clients are HE-capable with support for UL MU for data as well as control frames for these, "UL MU Disable" and "UL MU Data Disable" subfields are both set to 0.

(2) Clients with no support for TB UL MU transmissions (ul-mu-incapable devices). These clients include legacy clients including CCK, OFDM, HT and VHT-capable, as well as HE-capable with no UL MU support at all—for these, "UL MU Disable" subfield is set to 1 and "UL MU Data Disable" subfield is reserved since it would be redundant.

(3) HE-capable clients with UL MU support for control frames but not data frames—for these, "UL MU Disable" is set to 0 while "UL MU Data Disable" subfield is set to 1 (partially-ul-mu-capable devices). The partially-ul-mu-capable clients can either be kept separate from the fully-ul-mu-capable devices and the ul-mu-incapable devices, or combined in either of them, based on the composition of the capabilities of the stations associated to an AP.

In a mixed network of 802.11ax and legacy devices, we can run into a variety of scenarios with regards to distribution of associated stations, which can be grouped into three cases or scenarios:

(1) The number of filly-id-mu-capable devices is much higher than the number of ul-mu-incapable devices.

(2) The number of fully-ul-mu-capable devices is much lower than the number of ul-mu-incapable devices.

(3) The number of fully-ul-mu-capable devices is almost same as the number of ul-mu-incapable devices.

Based on this, we derive a new metric for the 802.11ax-capable APs: the he-ul-mu-client-density which can be defined as the ratio of the fully-ul-mu-capable clients to the total number of clients connected to the AP.

Based on the ratio, clients can be distributed in an extended network of APs such that the he-ul-mu-client-density for a given AP is made either as low as possible so that the AP is non UL capable client-heavy or as high as possible so that the AP is UL capable 802.11ax client-heavy. The client-pools formed based on this distribution requirement can either be tied to different BSSs either by using client-match algorithms, or by reconfiguring the PEW and MAC of the radio into simultaneous dual-radios that are configured on different channels on the same band or different bands.

As described in more detail with reference to FIG. 1, a Wireless Lan (WLAN) may include a plurality of Access Points (APs), as elements of the WLAN. These APs in the deployed network may be referred to as deployed APs for ease of discussion.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private work, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110aj, 140a-d, 150a-b may request and access the multimedia content provided by the content servers 160a-b.

Although 10 client devices 110a-j, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time.

Figure 2:
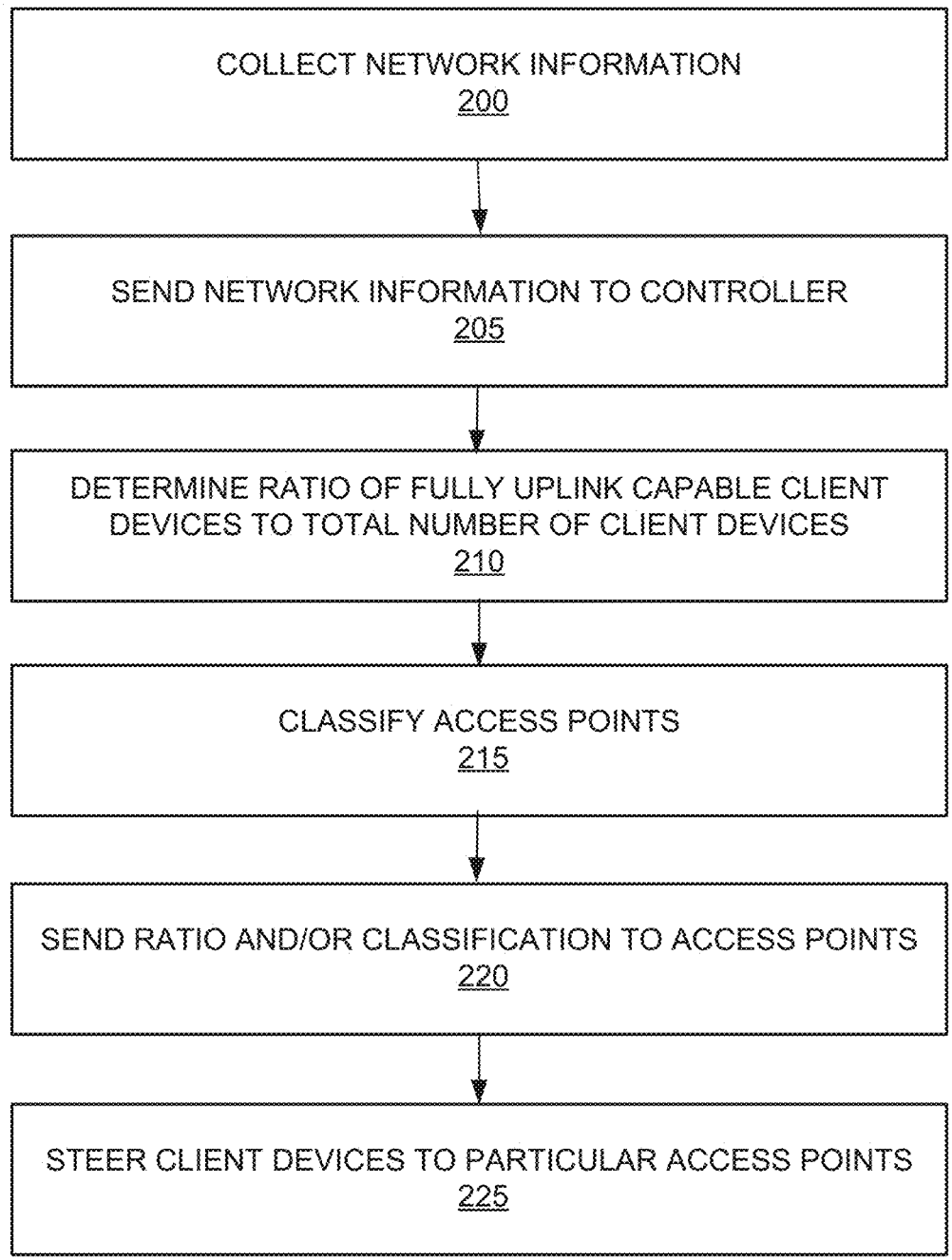
FIG. 2 is an example flowchart for dynamic client segregation in 802.11ax networks in accordance with one embodiment.

FIG. 2 is an example flowchart for dynamic client segregation in 802.11ax networks in accordance with one embodiment. Although the steps depicted in FIG. 2 are shown in an order, the steps may be performed in any order, and/or at any time.

In step 200, network information is collected. The information may be collected by each AP of the network, or by a subset of APs, or by any combination thereof. The information that is collected may be any information, may be processed by the AP, or may be unprocessed.

In step 205, network information is sent to the controller. The information may be sent in any format now known or later developed.

In step 210, the ratio of fully uplink capable client devices to the total number of client devices is determined. The ratio may be determined for each AP within the network or for a subset of the APs of the network.

In step 215, access points are classified. The APs may be classified in many different ways. In some embodiments, thresholds may be used to identify the low or high ratio APs. In particular, the APs may be classified as a low ratio or low threshold AP, wherein there are few fully ul-mu-capable client devices (and thus where ul-mu-incapable client devices should be steered), the APs may be classified as a high ratio or high threshold AP, where there are many fully ul-mu-capable client devices (and thus where fully ul-mu-capable client devices should be steered, or there may be an unclassified or undecided state where the ratio is not low or high. Many other configurations or setups are possible.

For example, in some networks, each AP may be characterized by a tuple of certain parameters (Rx RSSI, Tx EIRP, he-ul-mu-client-density, etc.) for each client, which makes the steer-destination of each client logically independent of each other in some respects. Since the he-ul-mu-client-density (i.e., the ratio) is an attribute of a particular AP radio, the AP radios may be sorted based on he-ul-mu-client density while assuming the other parameters to be identical. Then, a lower and upper threshold for the density of APs that we would want to characterize as 802.11ax-preferred APs may be determined.

Continuing the example, the low- and high-thresholds (representative values of 20% and 80% respectively) can be fixed for an extended network at the controller. The overall goal is to get the AP (radios) that are in the middle between low and high thresholds to fall into one of the categories (below low threshold or above high threshold). If, in a given deployment, we do not have a minimum number of APs above/below the high-/low-threshold, then the corresponding threshold can be temporarily optimized such that we have optimal number of APs beyond that threshold and also maintain an optimal gap between the two thresholds. Once the minimum conditions have been met, the thresholds can be defaulted to the value set by the controller.

Then, using the above thresholds, if the density is above the high-threshold, the AP can be categorized as being the hub for fully-ul-mu-capable clients and the AP would prefer to steer ul-mu-incapable clients to other APs in the network that have a density lower than the low-threshold or closer to it. While steering, the density of the other APs will be used as an input variable in the decision function along with the existing parameters. Optionally, steering might also choose APs between the low and high thresholds in case the other parameters suggest so. Partially ul-mu-capable clients may be steered to the above described hub or may be steered away.

If the density is below the lower-threshold, the AP can be categorized as being the hub for ul-mu-incapable clients and the AP would prefer to steer fully-ul-mu-capable clients to other APs in the network that have a density higher than the high-threshold or closer to it. While steering, the density of the other APs will be used as an input variable in the decision function along with the existing parameters. Optionally, steering might also choose APs density between the low and high thresholds in case the other parameters suggest so. Partially ul-mu-capable clients may be steered to the above described hub or may be steered away.

If the density is between the two thresholds, the AP can be categorized as undetermined. Such APs can be chosen for the steer in the above two conditions if they rank higher based on other parameters that are taken into account. For initiating a steer, these APs would follow both of the above approaches until the point they can be categorized by a density that is higher than the high-threshold or lower than the low-threshold. It should be noted that with every steer away from an undetermined AP, the AP moves closer to the density threshold nearest to it. Also, as for the AP towards which a client is steered: it will be decided by the decision function which will favor an AP with most polarized he-ul-mu-client-density keeping other steering parameters into account.

In step 220, the ratio and/or classification is sent to the access points. The ratio and/or classification may be sent to any access points at any time, in any format now known or later developed. The ratio and/or classification may be updated at any time, for any reason.

In step 225, client devices are steered towards particular access points. The steering may be handled as described above, to arrive at a network that has polarized the he-ul-mu-client-density, such that APs either have a high density or low density, within the confines of the particular network. The steering may be done at any time, for any reason, and in any manner now known or later developed. The steering may be repeated as many times as needed to arrive at a suitably optimized network.

Optionally, if an AP supports re-organizing its hardware modules such that a given radio can be converted into two radios that can operate simultaneously in real time on two different channels then the steering may be different.

For example, for APs that are incapable of steering their clients to other APs in the network because none of the other APs turn out to be better than itself for a majority of its clients, a decision can be made to refactor the radio into two or more simultaneous radios operating on two different channels. The benefit of this will be that the client-MAC-address-hashed master table in the client matching/steering algorithm would contain two distinct entries, one for each radio, and as a result, the subset table passed down to the AP will show an entry that has a more favorable density and has comparable other parameters. As a result, the steer can be effected between the two radios and we will shift from one radio with an undesirable he-ul-mu-client-density (a value between the two thresholds) to two radios with polarized density values.

Likewise, the opposite can also happen where two or more simultaneous radios maybe combined into one. Every AP can periodically check it's BSS on each of the radios and determine if the combined density would still qualify the AP to be beyond a threshold. This can happen if one of the BSSs has few clients and due to this, the combined density wouldn't be much different. In such a case, it may be okay to converge the two radios together so s to benefit from the increase in maximum PHY data rate.

Figure 3:
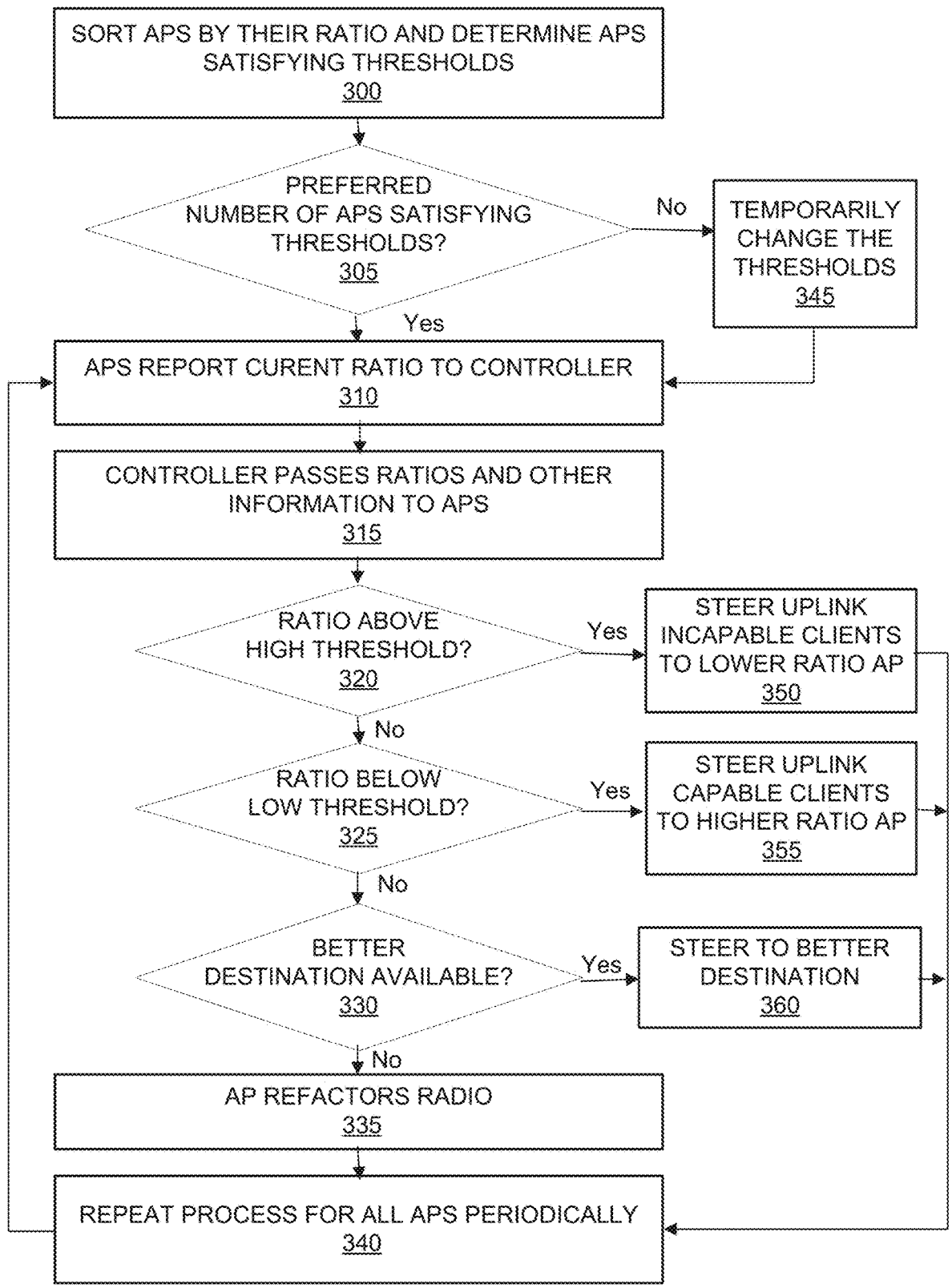
FIG. 3 illustrates an example flowchart for dynamic client segregation in 802.11ax networks in accordance with one embodiment.

FIG. 3 is an example flowchart for dynamic client segregation in 802.11ax networks in accordance with one embodiment. Although the steps depicted in FIG. 3 are shown in an order, the steps may be performed in any order, and/or at any time.

In step 300, the APs are sorted by their ratio and a determination is made regarding which APs satisfying thresholds. The sorting and determination may be made based on data collected prior to step 300. The data used may be any available data, collected at any time, in any manner.

In step 305, a determination is made whether a preferred number of APs satisfy the thresholds. If there is not a preferred number of APs satisfying the thresholds, the method proceeds to step 345. If there is a preferred number of APs satisfying the thresholds, the method proceeds to step 310. The preferred number of APs satisfying thresholds may be any amount, may vary dynamically, and may be set by any suitable entity.

In step 310, APs report their current ratio to the controller. The ratio may be reported in any manner now known or later developed. Any other information may also be reported to the controller.

In step 315, the controller passes ratios and other information to the APs. The controller may send the ratios for each AP to all of the APs in the network, so that each AP has the information necessary to make steering decisions. Any information, in any format, may be sent to any number or configuration of APs.

In step 320, a determination is made whether the ratio of a particular AP is above the high threshold. If the ratio is above the high threshold, the method proceeds to step 350. If the ratio is not above the high threshold, the method proceeds to step 325. The determination may be made in any suitable manner. The threshold may be set to any amount, may vary dynamically, and may be set by any suitable entity.

In step 325, a determination is made whether the ratio of a particular AP is below the low threshold. If the ratio is below the low threshold, the method proceeds to step 355. If the ratio is not below the low threshold, the method proceeds to step 330. The determination may be made in any suitable manner. The threshold may be set to any amount, may vary dynamically, and may be set by any suitable entity.

In step 330, a determination is made whether a better destination is available. If there is a better destination available, the method proceeds to step 360. If there is not a better destination available, the method proceeds to step 335. The determination may be made in any suitable manner and may be based on any suitable factor or factors.

In step 335, the AP refactors the radio. The refactoring may be done in any suitable manner, such as those discussed above.

In step 340, the process is repeated for all APs periodically. The process may be repeated as often as necessary. The frequency may vary or may stay on a same pattern or interval.

In step 345, the thresholds are temporarily changed. The thresholds are temporarily changed so that suitable APs may be classified or otherwise identified for steering. The change may last for any amount of time, and the thresholds may be changed any amount.

In step 350, uplink incapable clients are steered to lower ratio APs. Any number of clients may be steered in any suitable manner.

In step 355, uplink capable clients are steered to higher ratio APs. Any number of clients may be steered in any suitable manner.

In step 360, clients are steered to a better destination. Any number of clients may be steered in any suitable manner. The better destination may be based on any factor or factors.

Figure 4:
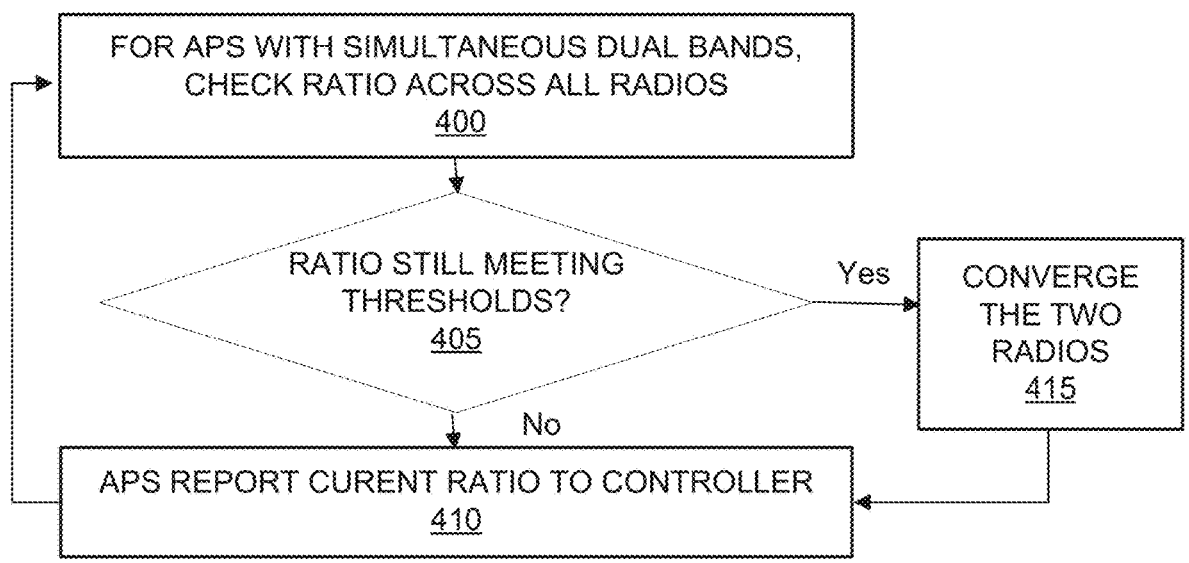
FIG. 4 illustrates an example flowchart for dynamic client segregation in 802.11ax networks in accordance with one embodiment.

FIG. 4 is an example flowchart for dynamic client segregation in 802.11ax networks in accordance with one embodiment. Although the steps depicted in FIG. 4 are shown in an order, the steps may be performed in any order, and/or at any time.

In step 400, the ratio is checked across all radios for APs with simultaneous dual band radios. The ratio may be checked in any suitable manner, such as that as described above.

In step 405, a determination is made whether the ratio still meets the thresholds. If the thresholds are still met, the method proceeds to step 415. If the ratio is not met, the method proceeds to step 410.

In step 410, the APs report their current ratio to the controller. The APs may report their ratio in any manner now known or later developed.

In step 415, the two radios of an AP are converged. The radios may be converged in any manner now known or later developed.

Figure 5A:
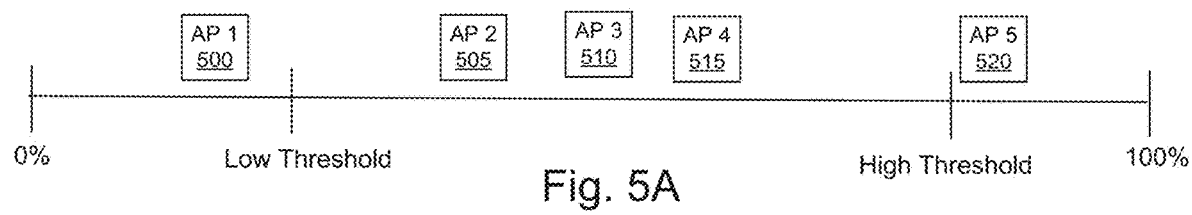
FIGS. 5A and 5B illustrate an example of dynamic client segregation in 802.11ax networks in accordance with one embodiment.
Figure 5B:
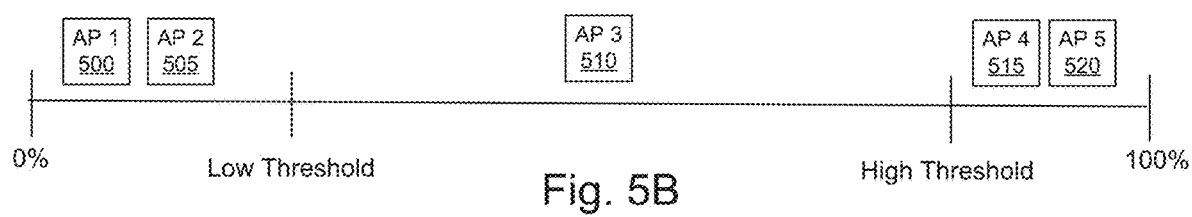

FIGS. 5A and 5B are examples of dynamic client segregation in 802.11ax networks in accordance with one embodiment. The example of FIGS. 5A and 5B have been simplified and the invention should not be limited to the specific configuration, details, or otherwise limited to the example shown in FIG. 5A and 5B.

In particular, FIG. 5A shows the ratio or distribution of fully ul-mu-capable clients relative to the total associated clients for 5 different APs, AP1 500, AP2 505, AP3 510, AP4 515, and AP5 520. FIG. 5A is shown before steering has occurred. Thus, most of the APs (AP2 505, AP3 510, and AP4 515) fall in-between the low threshold and the high threshold. As discussed above, AP1 500 would be identified as a hub for ul-mu-incapable clients, while AP5 520 would be a hub for ul-mu-capable clients. For this simplified example, clients are steered towards AP1 500 or AP5 520 as needed. Additional steering may occur to other APs based on a variety of factors.

FIG. 5B shows the results of the steering. The ratio of AP1 500 has gotten even lower, and the ratio of AP5 520 has gotten higher. Meanwhile, AP2 505 has also moved below the low threshold, and AP4 515 has moved above the high threshold. AP3 510 remains in the middle. Thus, the APs of the example network of FIG. 5A and 5B have become substantially more polarized, thereby offering a better experience for their clients.

Figure 6:
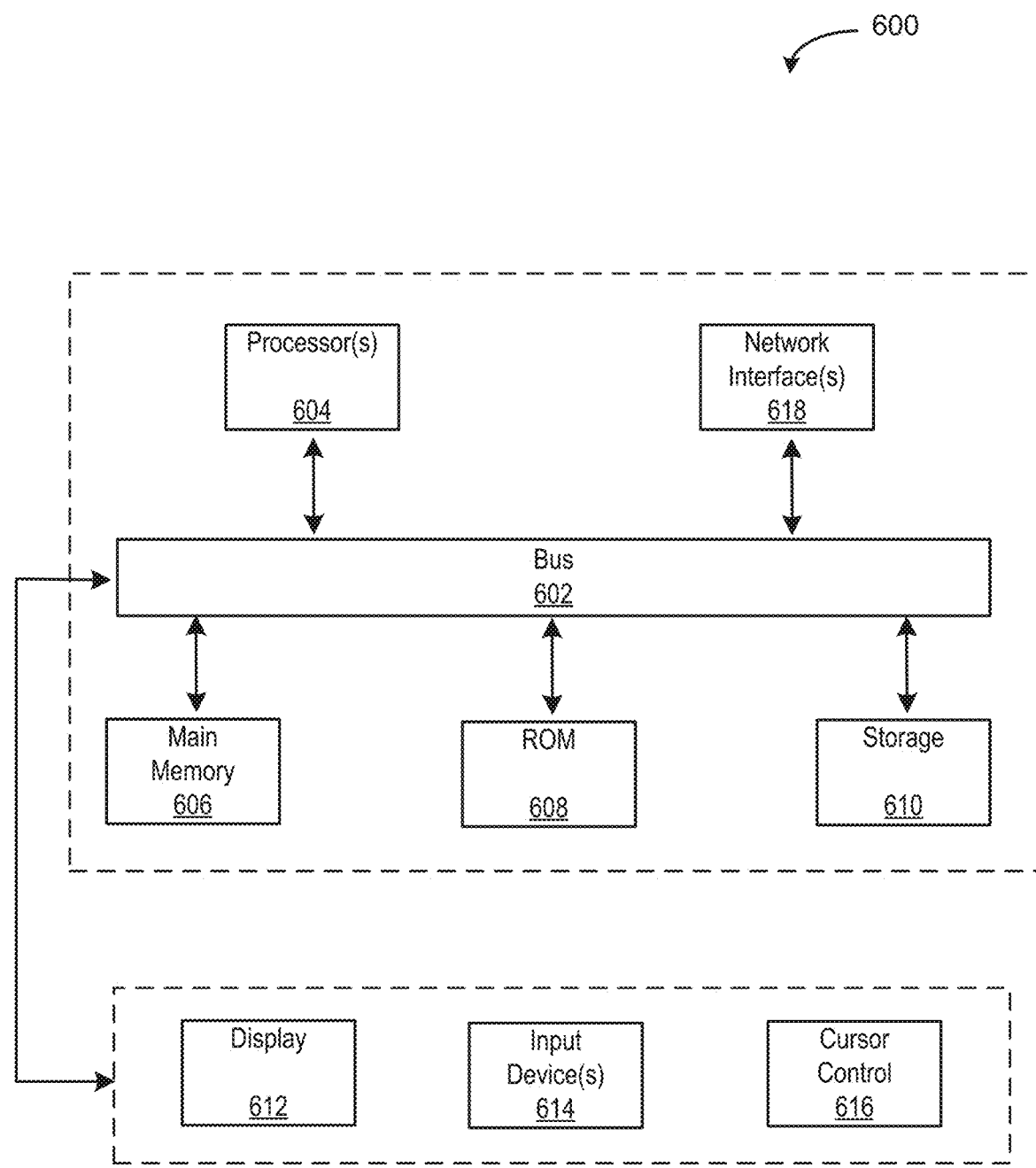
FIG. 6 is an example computing component that may be used to implement various features of embodiments described in the present disclosure.

FIG. 6 depicts a block diagram of an example computer system 600 in various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such s a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612. such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on di splay 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processors) 604 executing one or more sequences of one or more instructions contained in main memory 606. Such instructions may be read into main memory 606 from another storage medium, such as storage device 610. Execution of the sequences of instructions contained in main memory 606 causes processors) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   determining, for each access point of a plurality of access points in a network, a ratio comprising a number of fully uplink multi-user capable client devices to a total number of client devices connected to the access point; and
   steering, based on at least the ratio, client devices of the network to particular access points of the plurality of access points, wherein steering comprises moving a fully uplink multi-user capable client device from a first access point of the plurality of access points to a second access point of the plurality of access points, wherein the first access point is associated with a ratio below a first threshold, wherein the second access point is associated with a ratio above a second threshold, and wherein the first threshold is less than the second threshold.

2. The method of claim 1, wherein steering distributes a plurality of client devices of the network such that the ratio of each access point of the plurality of access points is either a low amount or a high amount.

3. The method of claim 1, wherein partially uplink multi-user capable client devices are grouped with uplink multi-user incapable client devices.

4. The method of claim 1, wherein partially uplink multi-user capable client devices are grouped with fully uplink multi-user capable client devices.

5. A non-transitory machine-readable storage medium encoded with instructions executable by a hardware processor of a computing component, the machine-readable storage medium comprising instructions to cause the hardware processor to:
   determine, for each access point of a plurality of access points in a network, a ratio comprising a number of fully uplink multi-user capable client devices to a total number of client devices connected to the access point; and
   steer, based on at least the ratio, client devices of the network to particular access points of the plurality of access points, wherein steering comprises moving a fully uplink multi-user capable client device from a first access point of the plurality of access points to a second access point of the plurality of access points, wherein the first access point is associated with a ratio below a first threshold, wherein the second access point is associated with a ratio above a second threshold, and wherein the first threshold is less than the second threshold.

6. The non-transitory machine-readable storage medium of claim 5, wherein steering distributes a plurality of client devices of the network such that the ratio of each access point of the plurality of access points is either a low amount or a high amount.

7. The non-transitory machine-readable storage medium of claim 5, wherein partially uplink multi-user capable client devices are grouped with uplink multi-user incapable client devices.

8. The non-transitory machine-readable storage medium of claim 5, wherein partially uplink multi-user capable client devices are grouped with fully uplink multi-user capable client devices.

9. A system, comprising:
   a processor;
   a memory, the memory storing instructions which, when executed by the processor, cause the processor to:
   determine, for each access point of a plurality of access points in a network, a ratio comprising a number of fully uplink multi-user capable client devices to a total number of client devices connected to the access point; and
   steer, based on at least the ratio, client devices of the network to particular access points of the plurality of access points, wherein steering comprises moving a fully uplink multi-user capable client device from a first access point of the plurality of access points to a second access point of the plurality of access points, wherein the first access point is associated with a ratio below a first threshold, wherein the second access point is associated with a ratio above a second threshold, and wherein the first threshold is less than the second threshold.

10. The system of claim 9, wherein steering distributes a plurality of client devices of the network such that the ratio of each access point of the plurality of access points is either a low amount or a high amount.

11. The system of claim 9, wherein partially uplink multi-user capable client devices are grouped with uplink multi-user incapable client devices.

* * * * *